United States Patent Office 3,239,592
Patented Mar. 8, 1966

3,239,592
ARC MELTING METALS
Karl S. Snow, Boulder City, Nev., assignor to Titanium Metals Corporation of America, New York, N.Y., a corporation of Delaware
No Drawing. Filed July 29, 1963, Ser. No. 298,423
8 Claims. (Cl. 13—9)

This application is a continuation-in-part of application Serial No. 180,817, filed March 19, 1962, now abandoned.

This invention relates to arc melting, and more particularly to arc melting of metals in vacuo employing alternating electric current as the arc power supply.

Vacuum arc melting of metals has become relatively widely used in recent years. Most often the metal to be melted is employed as a consumable electrode and direct current is used to initiate and maintain the melting arc. Some advantages could be obtained by using alternating current for melting power particularly in the cost of power supply equipment and also in operating cost. An alternating current is, however, generally less stable and more difficult to initiate than a direct current arc and appreciably so under the high vacuum desired in modern consumable electrode arc melting furnaces.

A principal object of this invention is to provide an improved method for consumable electrode arc melting metals in vacuo employing alternating electric current as the arc power supply. Another object of this invention is to provide a more stable alternating current arc for consumable electrode melting metals in vacuo. Another object of this invention is to provide an improved method for initiating an alternating current arc in a furnace for consumable electrode melting metals in vacuo. These and other objects of this invention will be apparent from the following description thereof.

In its broad aspects, this invention contemplates improving the stability of an alternating current arc employed for consumable electrode melting metals in an arc furnace under pressure of less than one millimeter of mercury absolute, by introducing pellets of potassium chloride into the arc melting zone. This improvement is obtained particularly when melting consumable electrodes of diameter greater than one inch, and at a linear melting rate less than 20 inches per minutes of individual electrode length.

It is to be understood that an alternating current arc may not be continuous as is a direct current arc, but when it follows the voltage cycle changes smoothly, dying out and promptly restriking when the voltage increases again it is considered stable as this term is herein employed.

Consumable electrodes employed in the process of this invention may be of circular cross section or may be of other geometric configuration as for example, octagonal, or when a trio of electrodes is employed they may be of sector-shaped cross section. The diameter of such electrodes of cross section other than circular shall be considered, for the purposes of this description and the appended claims to be the diameter of a circle of the same area as the cross section of such electrodes.

The size of the pellets of potassium chloride is important and critical. The size should be between about 3/16 inch and about 3/4 inch in diameter and, if the shape of the pellet is irregular, the average diameter should be within this range. Preferably the pellets are of regular shape, that is, cubes, lumps or pills of reasonably equal length and diameter. If the potassium chloride as used is the result of crushing compacted powder or previously melted salt, a proportion of fines smaller than the lower size limit as above defined may be present. This will not be harmful, but the effective arc stabilization will substantially be obtained as a result of the larger particles within the range of 3/16 to 3/4 inch.

Pellets or particles smaller than about 3/16 inch in diameter will be readily dissipated or blown out from the melting zone, that is, the vicinity of the arc underneath the electrode or electrodes and wil lnot materially contribute to formation of plasma for effecting arc stability. Pellets or chucks larger than about 3/4 inch in diameter will be generally too large to readily and conveniently introduce into the furnace and may be difficult to locate between the electrode, or electrodes, and the pool of molten metal, particularly if a short arc is being employed and the spacing between electrode and pool is of the order of one inch or less. Pellets sized between about 3/16 to about 3/4 inch will be found to have sufficient mass so that they are not readily blown out of the arc zone and at the same time are small enough to be easily fed into the furnace when needed and they fall naturally into the space between the electrode or electrodes and the pool of molten metal. Thus, their critical size enables them to be readily placed in the arc zone under the bottom of the electrode or electrodes where they tend to stay and volatilize to provide gaseous KCl which is decomposed to produce a plasma. Pellets of about 3/8 inch diameter will be found to be convenient to produce, will be effective to produce arc stabilization, and will be readily fed to and handled in the furnace.

The amount of potassium chloride employed will vary considerably according to the size of the electrodes used and the melting conditions. Generally speaking, no more should be used than is necessary to stabilize the arc. It may be added countinuously during the melting operation or may be added intermittently when the arc tends to be unstable and becomes extinguished. It has been found, for example, that about 1/2 pound of pellets of 3/8 inch size added to the melting zone in a three-phase alternating current arc furnace melting carbon steel will assistant in stabilizing the arc for a period of up to one hour or more when operating under vacuum of less than 100 microns.

It will be found advantageous to employ pellets of potassium chloride to eliminate stabilization problems when initiating an arc using alternating current. A striker plate of the same metal as the consumable electrode is first placed in the bottom of the cooled crucible and then a small amount, say from 1/4 to 1/2 pound of pellets of potassium chloride of size between about 3/16 and about 3/4 inch is placed directly under the electrode, or each of the three electrodes if three-phase alternating current is being used. In addition, a few metallic bodies also of the same metal as the electrode are arranged on the striker plate in the same vicinity as or in juxtaposition with the potassium chloride pellets; then, with power on, the electrodes are lowered until they contact these metallic bodies which due to the restricted cross sectional area available for current flow, quickly heat up and become molten. The metal bodies under each electrode should be between about 1/2 inch and 1 1/2 inches thick and have an aggregate effective cross sectional area between 1/100 and 1/4 of the electrode cross sectional area. As they melt down, they volatilize adjacent pellets of potassium chloride which provide plasma for arc initiation.

The following example illustrates a selected embodiment of the practice of this invention:

*Example 1*

Three consumable electrodes of a grade of low alloy steel and of sector-shaped cross section were arranged in a cluster with their flat sides in spaced face to face relation and each was individually attached by a stub to an electrode drive ram. Each electrode had a cross sectional area of 93 square inches, equivalent to a diameter of approximately 11 inches, and a length of 115 inches not including the attaching stub.

The electrodes were supported in an enclosed furnace and each provided with a screw type driving mechanism with the motion of the drive ram controlled by an electrical system including an amplidyne, responsive to changes in the arc voltage and current.

The furnace contained a water-jacketed crucible of 28 inches inside diameter.

A three-phase alternating current power supply was connected to the electrodes, one phase being connected to each electrode.

A striker plate about 1 inch thick and of the same alloy as the consumable electrodes was placed in the bottom of the crucible. On the striker plate and directly below and aligned with each of the three electrodes was placed about 1/3 pound of potassium chloride pellets in the form of pills which had been compacted from powdered potassium chloride. The pills were about 3/8 inch in diameter and about 3/8 inch thick. In addition to the potassium chloride pellets and also directly aligned underneath each electrode was placed two or three bodies of the same steel alloy as the striker plate and the electrodes. These steel bodies were formed as projections on the striker plate upper surface and were about 1/2 inch thick with an irregular upper surface equivalent to about 1/10 of the electrode cross section.

The furnace interior was evacuated to a pressure of about 25 microns of mercury absolute measured at the furnace throat, and the electrode control and driving mechanisms actuated and the electrodes were lowered so that each contacted the metal bodies on the striker plate. When contact between the electrodes and the metal bodies was made the current passing between the electrodes, through the metal bodies and the striker plate, caused the metal bodies to heat up and become molten. The heat thus generated volatilized adjacent pellets of potassium chloride to form a plasma underneath each electrode and each of the metal bodies melted down to form a gap between the electrodes and the striker plate an arc was initiated. The electrode driving ram control systems were adjusted to maintain this arc at a length of about 3/4 inch. Metal melting from the consumable electrodes was transferred to the crucible to form a pool of molten metal which progressively froze to form a solid ingot.

The current used was provided by a transformer having a tap setting to provide 137 volt phase to phase, and 79 volt phase to neutral, open circut voltage. The external reactance was 24.7%. Melting power varied from 600 to 1100 kw. during the melt.

After 51 minutes of melting it was noticed that the arc was showing signs of instability evidenced by periods when the arc would not restrike after pasage of the voltage through zero when changing polarity. At this time about 1/3 to 1/2 pound of the same size pellets of potassium chloride that had been employed for initiating the arc, as described above, were introduced into the furnace interior through a side arm connected to an evacuated supply container, the pellets falling down into the melting zone between the pool of molten metal and the bottom of the electrodes. As soon as the potassium chloride thus added reached the melting zone, an immediate improvement in arc stability was noted. The arc continued stable until 87 minutes after the start of melting when instability was again noted in the arc. An additional 1/2 pound of similar potassium chloride pellets was added and the arc successfully stabilized until 96 minutes after the start of the melt when it became necessary to add another 1/2 pound of the same size of potassium chloride pellets. Following the addition of potassium chloride at 96 minutes after the melt start, the arc continued stable until the end of the melt at 200 minutes after the time of starting.

Furnace power was shut down, the furnace disassembled and the ingot was removed from the crucible and found to weigh 7,297 pounds. The melting rate by weight was determined to be 36.45 pounds per minute and the linear melting rate was 0.65 inch per minute of individual electrode length employing an average furnace pressure of about 25 microns and an average secondary amperage of 10,230 amperes per phase.

The potassium chloride pellets added for arc stabilization had no detrimental effect on the ingot produced. This salt was volatilized during melting under the low pressure and high temperature conditions.

The method of this invention is useful for promoting arc stability when melting consumable electrodes under vacuum of less than about 1 millimeter of mercury absolute, using an alternating current power supply. It provides a plasma so that an arc can be maintained between an electrode or electrodes and the pool of molten metal in the furnace crucible when the furnace is operated under conditions which would result in intermittent arcing and periods when the arc could not be restruck and maintained. The problem of initiating an arc with alternating current can be solved according to the method of this invention.

The improved process of this invention should be distinguished from methods employed to promote arc stability in the welding art wherein various agents, including elements which may contribute plasma to the arc, are employed in electrode coatings or are otherwise attached to or made part of the outer surface of a welding electrode. Such agents may contribute to arc stability under welding conditions because the electrode is of small diameter of the order of a fraction of an inch and never as much as one inch. Under these conditions, a stabilizing agent can diffuse and travel from the outside of such an electrode underneath it and remain sufficiently in the melting zone to provide arc stabilization. In the case of consumable electrodes for melting metal, these are generally of diameter larger than one inch and may be many times this size. The physical dimensions of a larger diameter electrode will prevent a surface coated agent from being efficiently placed in the melting zone underneath the bottom of an electrode where it can stabilize an arc between it and the pool of molten metal in the furnace crucible.

The rate of consumable electrode burn-off (corresponding to the linear melting rate) is also important. In the case of consumable type electrodes used in welding the burn-off or linear melting rate may be of the order of 100 inches or several times this figure per minute. At this melting rate surface coatings can be correspondingly introduced into the melting arc without loss by flowing out or volatilization. But in large diameter electrodes consumed in an arc melting furnace, the linear melting rate is of quite a different order of magnitude being only a few inches, or less, per minute and never more than about 20 inches per minute of electrode length. Due to the slow linear melting rate and enclosure in the furnace, a consumable electrode of metal being melted into an ingot becomes very hot near and at its bottom in close proximity to the arc and the molten pool of metal beneath. This would volatilize surface coated material having relatively low boiling point before it had any opportunity to be present under the electrode bottom in the melting zone where it could provide any effect. Under the high vacuum conditions of the operation of the present invention the volatilization of surface coated material would be substantially intensified. Stabilizing agents such as alkali metal chlorides would be readily volatilized and carried away from the arc before they had any opportunity to exert any arc stabilizing effect. Employment of pellets of potassium cholride according to this invention can, however, as described, place this agent in the melting zone for effective stabilization of an alternating current arc.

Potassium chloride is not an expensive salt. It may readily be formed, as by compacting, into suitable size pellets and has no detrimental effect on the quality of the metal ingots produced.

I claim:

1. In a method for melting consumable electrodes of metal of diameter greater than one inch in an arc furnace under pressure of less than 1 millimeter of mercury absolute and at a linear melting rate of less than 20 inches of individual electrode length per minute, and employing alternating current as melting power, the improvement for stabilizing the arc which comprises; introducing into the melting zone in said furnace during melting of said electrodes, pellets of potassium chloride of diameter between about 3/16 and about 3/4 inch.

2. In a method for melting consumable electrodes of metal of diameter greater than one inch in an arc furnace under pressure of less than 1 millimeter of mercury absolute and at a linear melting rate of less than 20 inches of individual electrode length per minute, and employing alternating current as melting power, the improvement for stabilizing the arc which comprises; employing a trio of consumable electrodes each connected to one phase of a three-phase alternating current source and introducing into the melting zone in said furnace during melting of said electrodes, pellets of potassium chloride of diameter between about 3/16 and about 3/4 inch.

3. In a method for melting consumable electrodes of metal of diameter greater than one inch in an arc furnace under pressure of less than 1 millimeter of mercury absolute and at a linear melting rate of less than 20 inches of individual electrode length per minute, and employing alternating current as melting power, the improvement for stabilizing the arc which comprises; employing a trio of consumable electrodes each connected to one phase of a three-phase alternating current source and introducing intermittently into said melting zone in said furnace about 1/2 pound of pellets of potassium chloride of diameter between about 3/16 and about 3/4 inch.

4. In a method for melting consumable electrodes of metal of diameter greater than one inch in an arc furnace under pressure of less than 1 millimeter of mercury absolute and at a linear melting rate of less than 20 inches of individual electrode length per minute, and employing alternating current as melting power, the improvement for stabilizing the arc which comprises; employing a trio of consumable electrodes each connected to one phase of a three-phase alternating current source and introducing intermittently into said melting zone in said furnace about 1/2 pound of pellets of potassium chloride of average diameter about 3/8 inch.

5. In a method for melting consumable electrodes of metal of diameter greater than one inch in an arc furnace under pressure of less than 1 millimeter of mercury absolute and at a linear melting rate of less than 20 inches of individual electrode length per minute, and employing alternating current as melting power, the improvement for stabilizing the arc during initiation of the arc which comprises; employing a trio of consumable electrodes each connected to one phase of a three-phase alternating current source, placing a striker plate of the same metal as the metal of said electrodes in the bottom of said crucible, placing pellets of potassium chloride on said striker plate below each of said electrodes and aligned therewith, arranging metal bodies of the same metal as said electrodes and of effective thickness between about 1/2 inch and about 1 1/2 inches on said striker plate in juxtaposition with said pellets of potassium chloride, lowering said electrodes until current passes between said electrodes through said metal bodies and said striker plate thereby to melt said metal bodies and volatilize said pellets of potassium chloride to supply plasma for stabilization of the arc.

6. In a method for melting consumable electrodes of metal of diameter greater than one inch in an arc furnace under pressure of less than 1 millimeter of mercury absolute and at a linear melting rate of less than 20 inches of individual electrode length per minute, and employing alternating current as melting power, the improvement for stabilizing the arc during initiation of the arc which comprises; employing a trio of consumable electrodes each connected to one phase of a three-phase alternating current source, placing a striker plate of the same metal as the metal of said electrodes in the bottom of said crucible, placing between 1/3 and 1/2 pound of pellets of potassium chloride of diameter between about 3/16 and about 3/4 inch on said striker plate below each of said electrodes and aligned therewith, placing metal bodies of the same metal as said electrodes and of effective thickness between about 1/2 inch and about 1 1/2 inches on said striker plate in juxtaposition with said pellets of potassium chloride, lowering said electrodes until current passes between said electrodes through said metal bodies and said striker plate thereby to melt said metal bodies and volatilize said pellets of potassium chloride to supply plasma for stabilization of the arc.

7. In a method for melting consumable electrodes of metal of diameter greater than one inch in an arc furnace under pressure of less than 1 millimeter of mercury absolute and at a linear melting rate of less than 20 inches of individual electrode length per minute, and employing alternating current as melting power, the improvement for stabilizing the arc which comprises; employing a trio of consumable electrodes each connected to one phase of a three-phase alternating current source, for initiation of the arc placing a striker plate of the same metal as the metal of said electrodes in the bottom of said crucible, placing pellets of potassium chloride of diameter between about 3/16 and about 3/4 inch on said striker plate below each of said electrodes and aligned therewith, arranging metal bodies of the same metal as said electrodes and of effective thickness between about 1/2 inch and about 1 1/2 inches on said striker plate in juxtaposition with said pellets of potassium chloride, lowering said electrodes until current passes between said electrodes through said metal bodies and said striker plate thereby to melt said metal bodies and volatilize said pellets of potassium chloride to supply plasma for stabilization of the arc, and during melting of said electrodes, introducing into the melting zone in said furnace pellets of potassium chloride of diameter between about 3/16 and about 3/4 inch.

8. In a method for melting consumable electrodes of metal of diameter greater than one inch in an arc furnace under pressure of less than 1 millimeter of mercury absolute and at a linear melting rate of less than 20 inches of individual electrode length per minute, and employing alternating current as melting power, the improvement for stabilizing the arc which comprises; employing a trio of consumable electrodes each connected to one phase of a three-phase alternating current source, for initiation of the arc placing a striker plate of the same metal as the metal of said electrodes in the bottom of said crucible, placing pellets of potassium chloride of diameter between about 3/16 and about 3/4 inch on said striker plate below each of said electrodes and aligned therewith, placing metal bodies of the same metal as said electrodes and of effective thickness between about 1/2 inch and about 1 1/2 inches on said striker plate in juxtaposition with said pellets of potassium chloride, lowering said electrodes until current passes between said electrodes through said metal bodies and said striker plate thereby to melt said metal bodies and volatilize said pellets of potassium chloride to supply plasma for stabilization of the arc; and during melting of said electrodes, introducing intermittently into the melting zone in said furnace about 1/2 pound of pellets of potassium chloride of diameter between about 3/16 and about 3/4 inch.

(References on following page)

References Cited by the Examiner

UNITED STATES PATENTS

| | | | |
|---|---|---|---|
| 873,958 | 12/1907 | Von Pirani | 13—34 X |
| 2,112,161 | 3/1938 | Kelly | 13—9 |
| 2,473,601 | 6/1949 | Lobosco | 219—74 |
| 2,694,764 | 11/1954 | Muller | 219—74 |
| 3,019,274 | 1/1962 | Gruber et al. | 13—31 |

RICHARD M. WOOD, *Primary Examiner.*

JOSEPH V. TRUHE, SR., *Examiner.*